United States Patent [19]

Guérin

[11] Patent Number: 4,471,284

[45] Date of Patent: Sep. 11, 1984

[54] REVERSIBLE STEPPING MOTOR

[75] Inventor: Yves Guérin, Granges, Switzerland

[73] Assignee: ETA S.A., Fabriques d'Ebauches, Ganges, Switzerland

[21] Appl. No.: 486,658

[22] Filed: Apr. 20, 1983

[30] Foreign Application Priority Data

Apr. 21, 1982 [CH] Switzerland .......................... 2412/82

[51] Int. Cl.[3] ............................................ H02K 29/04
[52] U.S. Cl. .................................... 318/696; 318/685; 368/157
[58] Field of Search ....... 318/696; 310/49 R, 40 MM; 368/76, 157

[56] References Cited

U.S. PATENT DOCUMENTS

| | | | |
|---|---|---|---|
| 3,958,167 | 5/1976 | Nakamima et al. | 318/329 |
| 4,126,796 | 11/1978 | Ito | 310/40 |
| 4,144,467 | 3/1979 | Nakajima et al. | 310/49 R |
| 4,361,790 | 11/1982 | Laesser et al. | 318/696 |
| 4,367,049 | 1/1983 | Laesser et al. | 368/76 |
| 4,371,821 | 2/1983 | Laesser et al. | 318/696 |
| 4,382,693 | 5/1983 | Tu Xuan | 368/160 |
| 4,396,846 | 8/1983 | Calame | 310/49 R |
| 4,423,342 | 12/1983 | Mokdad | 310/41 |

FOREIGN PATENT DOCUMENTS 2427742  7/1977  Fed. Rep. of Germany .

WO81/01205  4/1981  PCT Int'l Appl. .

Primary Examiner—J. V. Truhe
Assistant Examiner—Saul M. Bergmann
Attorney, Agent, or Firm—Pollock, Vande Sande & Priddy

[57] ABSTRACT

The motor comprises a stator with three pole pieces having pole faces which define a cylindrical space, two windings which are magnetically coupled to the first and the second pole piece, and to the first and the third pole piece respectively, a rotor which is concentric with respect to the cylindrical space and which comprises a first permanent magnet, and a second permanent magnet coupled with the first magnet for holding the rotor, in the absence of any other influence, in a position in which the magnetic axis of the first magnet coincides with a rest axis. The field produced in the cylindrical space by the flow of a current in any one of the windings is at an obtuse angle to the rest axis.

The rotor performs 360° steps in response to pairs of current pulses, the first of which is applied to one of the windings and the second is applied to the other of the windings. Those pulses have always the same direction, and the order in which they are applied to the windings determines the direction of rotation of the rotor.

The motor can be used in particular in an electronic timepiece.

7 Claims, 8 Drawing Figures

REVERSIBLE STEPPING MOTOR

BACKGROUND OF THE INVENTION

The present invention concerns a reversible stepping motor comprising first, second and third pole pieces which respectively comprise first, second and third pole faces defining therebetween a substantially cylindrical space, a first winding which is magnetically coupled to the first pole piece and the second pole piece, a second winding which is magnetically coupled to the first pole piece and the third pole piece, and a rotor mounted rotatably about an axis which is substantially coincident with the axis of the cylindrical space and comprising a permanent magnet having a magnetic axis substantially perpendicular to the axis of rotation.

Such a motor is described in published British patent application GB No. 2 054 978 A and may be advantageously used in an electronic timepiece for driving the time information display members, generally comprising hour and minute hands and often a second hand. The above published application also describes the method which is used to rotate the rotor of the motor in steps of 180° in one direction or the other.

That method comprises supplying one of the windings with a current pulse of a first type, being of a given direction which is constant during the pulse, whenever the rotor is to rotate through one step, and at the same time supplying the other winding with a current pulse of a second type, the direction of which changes approximately in the middle of the pulse. The direction of the pulse of the first type changes for each step of the motor and so does the direction at the beginning of the pulses of the second type. The direction of rotation of the rotor depends on the winding to which the pulses of the first type are applied.

The known method involves the provision of eight power transistors in the motor actuating circuit. The eight transistors are grouped in two bridge arrangements of four transistors, one of the coils being connected into each of the bridge arrangements. The transistors take up a fairly large area on the integrated circuit which combines all the electronic circuits of the apparatus with which the motor is associated.

The motor rotates through steps of 180°, which means that, if for one reason or another it does not react to the current pulses which are applied to its windings at a given time, it also does not react to the pulses which are applied the moment after, as in that case the motor rotor is not in the position corresponding to the polarity of those pulses. The motor therefore loses two steps.

SUMMARY OF THE INVENTION

The object of the present invention is to provide a stepping motor of the type described above, but which does not suffer from those disadvantages, that is to say, it can be actuated in a very simple manner by means of a circuit which comprises only a reduced number of power transistors. In addition, the motor according to the invention does not necessarily lose a second step if, for some reason, it has lost a first step.

All these objects are achieved by the claimed motor which comprises means for orienting the magnetic axis of the magnet of the rotor, in the absence of any other influence, along a rest axis substantially parallel to a straight line which is perpendicular to the axis of rotation and which passes through the middle of the first pole face.

In a first embodiment of the motor, the orienting means comprise a positioning magnet whose magnetic axis is disposed at least approximately in a plane defined by the straight line and by the axis of rotation of the rotor.

In another embodiment, the orienting means further comprise a second positioning magnet whose magnetic axis is substantially symmetrical to the magnetic axis of the first positioning magnet relative to said straight line.

The arrangement of the motor according to the invention makes it possible to actuate the motor with pairs of successive current pulses, in the same direction, the first being applied to one of the windings and the second being applied to the other winding. The winding to which the first pulse of each pair is applied determines the direction in which the rotor rotates.

A consequence of the provision of the positioning magnet is that the rotor has only one rest position. The direction of the pulses is therefore always the same, which, in one embodiment of the actuating circuit at least, makes it possible to use only two power transistors in all in the motor actuating circuit.

Other embodiments of the actuating circuit comprise three or four power transistors. In all cases, the area occupied by the power transistors on the integrated circuit is markedly less than the area taken up by the power transistors which are required to actuate the motor described in the above-referenced British patent application.

BRIEF DESCRIPTION OF THE DRAWINGS

The motor according to the invention will now be described in detail with reference to the accompanying drawings in which.

DESCRIPTION OF THE PREFERRED EMBODIMENTS

Figures 1, 1A:
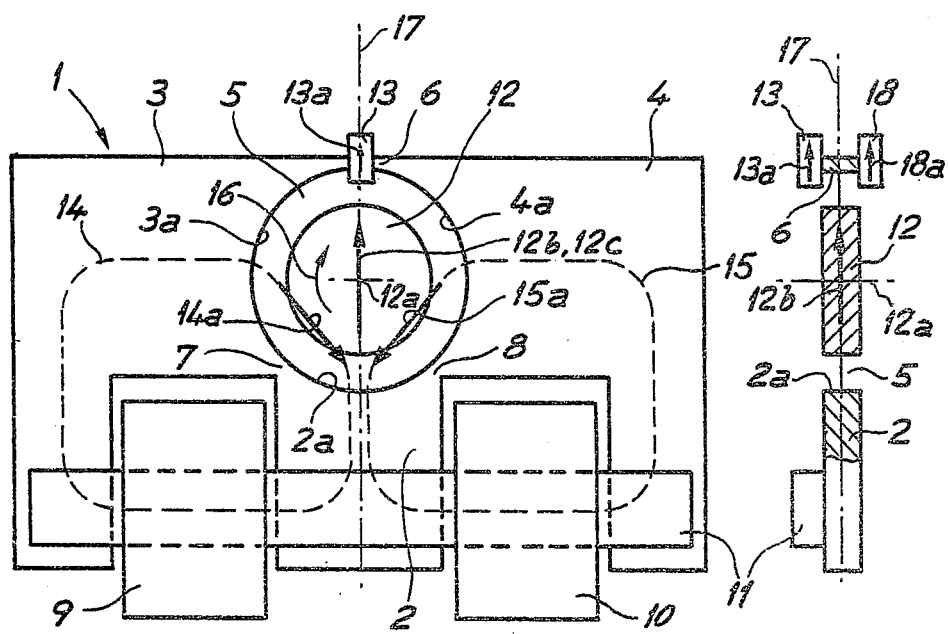
FIG. 1 is a plan view of the motor according to the invention.
FIG. 1a is a view in partial cross-section of a particular embodiment of the motor shown in FIG. 1.

The motor illustrated by way of non-limiting example in FIG. 1 comprises a stator 1 formed by a plate of soft magnetic material.

The stator 1 comprises a first pole piece 2 of which one end is cut out in the form of a concave circular arc and forms a first pole face 2a.

The stator comprises two further pole pieces 3 and 4, each having an end which is cut out in a concave circular arc, thus forming two further pole faces 3a and 4a respectively.

The pole pieces 2, 3 and 4 are so disposed that the pole faces 2a, 3a and 4a define a cylindrical space 5 therebetween. The ends of the pole faces 2a, 3a and 4a are connected by regions 6, 7 and 8 in the form of isthmus portions of sufficiently narrow section that their reluctance is markedly greater than that of the pole pieces 2, 3 and 4 and the remainder of the magnetic circuit which will be described below.

In the embodiment described herein, the isthmus portions 6, 7 and 8 form one piece with the pole pieces 2, 3 and 4. It will be apparent that, in other embodiments, the isthmus portions could be replaced by pieces of non-magnetic material, or even omitted and replaced by air gaps.

The motor shown in FIG. 1 further comprises two windings 9 and 10 which are disposed on a common core 11. The ends of the core 11 are magnetically coupled to the ends of the pole pieces 3 and 4 which are opposite to the pole faces 3a and 4a. The central portion of the core 11, which is disposed between the windings 9 and 10, is connected to the end of the pole piece 2, which is opposite to the pole face 2a.

The core 11 is connected to the pole pieces 2, 3 and 4 in a manner (not shown) such that the reluctance of the connecting regions is as low as possible.

The motor further has a rotor which conventionally comprises a shaft having an axis of rotation substantially coincident with the axis of the cylindrical space 5. A permanent magnet and a pinion intended to engage with a toothed wheel are fixed to the shaft. The toothed wheel may be the first wheel of a gear train for driving for example the hands of a timepiece. In order not to encumber the drawing to no purpose, only the permanent magnet forming part of the rotor is illustrated, being indicated by reference numeral 12. The axis of rotation of the rotor, which is perpendicular to the plane of FIG. 1, is indicated at 12a.

The magnet 12, which is cylindrical in shape, is magnetized diametrically. Its magnetic axis which is perpendicular to the axis of rotation 12a is diagrammatically indicated by the arrow 12b. As usual, that arrow 12b is drawn from the south pole of the magnet 12 to its north pole.

Finally, the motor comprises a positioning magnet 13 in the form of a longitudinally magnetized bar which is fastened by any suitable means, not shown, in the vicinity of the isthmus portions 6 in such a way that its magnetic axis 13a is disposed on a straight line 17 passing substantially through the middle of the pole face 2a and the axis of rotation 12a. In the embodiment described herein, the magnetic axis 13a is oriented in a direction from the middle of the pole face 2a towards the axis of rotation 12a.

The field of the magnet 13 applies to the magnet 12 forming part of the rotor, a positioning torque with a period of 360°, which tends to hold the magnetic axis 12b in or return it to the position shown in FIG. 1. In that position which is the rest position of the magnet 12 and therefore the rotor of which it is part, the magnetic axis 12b coincides with a rest axis indicated at 12c which is obviously of the same orientation and in the same direction as the magnetic axis 13a of the magnet 13.

When a current flows through the winding 9, for example, the magnetic field generated by the current follows a magnetic circuit comprising, in series, the core 11, the pole piece 3, the cylindrical space 5 between the pole pieces 2, 3 and 4, and the pole pieces 2 and 4 in parallel.

In the cylindrical space 5, that magnetic field is perpendicular to the axis of rotation 12a of the magnet 12.

The lines of force of that magnetic field are diagrammatically indicated by the broken line 14. In order not to encumber the drawings, these lines of force are not illustrated in the pole piece 4.

The arrow 14a diagrammatically indicates the resultant of the field generated by the winding 9 in the cylindrical space 5, between the pole face 3a and the pole faces 2a and 4a. The direction of the arrow 14a denotes the direction of the field generated by a current flowing in the winding 9 in a direction which is arbitrarily designated positive.

Similar considerations may be applied in regard to the field generated by the flow of a current in the winding 10. The broken line 15 diagrammatically indicates the lines of force of that magnetic field, while the arrow 15a represents the resultant of that field in the cylindrical space 5, with the direction and orientation of the field when a current arbitrarily designated positive flows in the winding 10. That resultant is also perpendicular to the axis of rotation 12a.

It is important to note that, with the directional convention defined hereinbefore, the resultants of the fields generated in the cylindrical space 5 by positive currents flowing in the windings 9 and 10 form, relative to the rest axis 12c, obtuse angles which are substantially symmetrical to each other with respect to the rest axis 12c. Those angles are defined, in the manner which is normal practice in geometry, as being the angles that would be formed by the arrows 12c and 14a, 15a respectively, if they were displaced parallel to themselves until their points of origin were coincident.

The magnitude of those angles depends on the relative arrangement of the various components of the motor and primarily the angular distances occupied around the cylindrical space 5 by the pole faces 2a, 3a and 4a.

In practice, those angles are from 100° to 160° approximately, and are preferably substantially equal to 120°.

Figures 2, 4A, 4B:
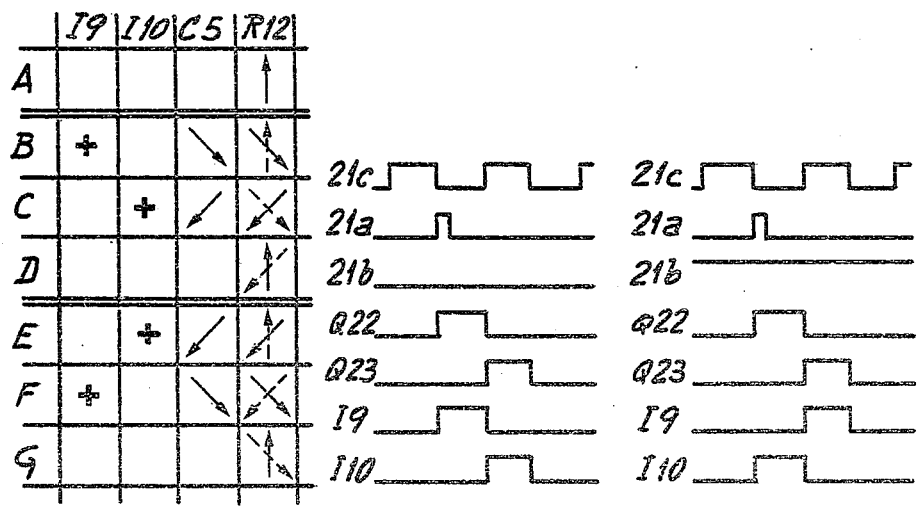
FIG. 2 is a table summarizing the various stages in actuation of the motor shown in FIG. 1.
FIGS. 4a and 4b are diagrams representing signals as measured at various points in the circuit shown in FIG. 3, during the various stages in actuation of the motor shown in FIG. 1.

In FIG. 2 which will now be used to describe the mode of operation of the motor, the above-mentioned angles are arbitrarily selected as being equal to 135° approximately, so as to make the drawing as clear as possible.

FIG. 2 shows a table summarizing the various stages in actuation of the motor shown in FIG. 1. Line A in the table corresponds to the rest condition of the motor. Each of the other lines B to G corresponds to one of the stages in actuation of the motor.

A sign + in one of the columns designated I9 and I10 indicates that a positive current is flowing in the winding 9 or the winding 10 in the corresponding stage.

The arrows in column C5 indicate the direction and the orientation of the resultant of the field generated in the space 5 by the current indicated in column I9 or I10 on the same line.

The position assumed by the rotor in response to those fields or under the influence of the positioning torque is indicated by the arrows shown in solid lines in column R12. The direction and orientation of those arrows correspond to the direction and orientation of the arrow 12b representing the field of the magnet 12. The broken-line arrows shown in column R12 indicate the position that the rotor occupied before assuming the position shown by the solid-line arrows.

Line A in the table shown in FIG. 2 corresponds to the rest position of the motor. No current is flowing in the windings 9 and 10 and the rotor is in the position shown in FIG. 1, in which the magnetic axis 12b of the magnet 12 coincides with the rest axis 12c.

Lines B, C and D in the table shown in FIG. 2 summarize the mode of actuating the motor in order for the rotor to perform one step, that is to say, a complete revolution, in the direction indicated by the arrow 16 in FIG. 1, which is arbitrarily selected as the positive direction of rotation.

A positive current is first caused to flow in the winding 9 by an actuating circuit, an example of which will be described hereinafter (line B). The magnet 12 is therefore subjected to the field indicated in column C5. If the intensity of the current in the winding 9 is sufficient, the rotor rotates in the positive direction to the position indicated in column R12, where the magnetic axis 12b becomes parallel to the field generated by the current.

When the rotor reaches that position, at least approximately, the actuating circuit cuts off the current in the winding 9 and causes a current which is also positive to flow in the winding 10 (line C). The field generated by that current in the cylindrical space 5 is indicated in column C5. The rotor continues to rotate in the positive direction until reaching the position shown in column R12 where the magnetic axis 12b becomes parallel to the field.

When the rotor reaches that position, at least approximately, the actuating circuit cuts off the current in the winding 10 (line D). The magnet 12 is then subjected only to the positioning torque produced by the magnet 13 and it terminates its rotary movement in response to that torque. The rotor therefore returns to the position shown in column R12, where the magnetic axis 12b coincides with the rest axis 12c.

The rotor has therefore performed one step in the positive direction, that is to say a complete revolution in response to a pair of positive current pulses, the first thereof being applied to the winding 9 and the second being applied to the winding 10.

It will be apparent that the rotor again performs a complete revolution in the positive direction whenever such a pair of pulses is applied to the windings 9 and 10 in that order.

Lines E, F and G of the table shown in FIG. 2 summarize the mode of actuating the motor in order for its rotor to perform one step, that is to say also a complete revolution, in the negative direction.

A positive current is first caused to flow in the winding 10 by the actuating circuit (line E). The field generated by that current in the cylindrical space is indicated in column C5 and the rotor rotates in a negative direction to the position shown in column R12 where the magnetic axis 12b becomes parallel to that field.

When the rotor reaches that position, at least approximately, the actuating circuit cuts off the current in the winding 10 and causes a current which is also positive to flow in the winding 9 (line F). The field generated by that current in the cylindrical space 5 is indicated in column C5. The rotor continues to rotate in the negative direction until it reaches the position shown in column R12, where the magnetic axis 12b becomes parallel to that field.

When the rotor reaches that position, at least approximately, the actuating circuit cuts off the current in the winding 9 (line G). The rotor is then subjected only to the positioning torque produced by the magnet 13 and it terminates its rotary movement in response to that torque.

The rotor has therefore performed a step in the negative direction in response to a pair of positive current pulses, the first being applied to the winding 10 and the second being applied to the winding 9.

It will be apparent that the rotor again performs a complete revolution in the negative direction whenever such a pair of pulses is applied to the windings 10 and 9 in that order.

It is important to note that, in the example described herein, the orientation of the rest axis 12c and the direction of the fields generated by the currents in the windings 9 and 10 are so selected that the angles that they form in the cylindrical space 5, in the above-defined sense, are obtuse angles. By virtue of that selection, the rotor rotates through an angle greater than 90° in response to the first pulse of each pair of pulses, which permits the second pulse to cause it to continue its rotary movement, and not simply return it to its rest position.

If the magnetic axis 13a of the positioning magnet 13 were oriented in the opposite direction to that shown in FIG. 1, the rest axis 12c of the magnet 12 would also be in the opposite direction to that shown in FIG. 1. In that case, it would be sufficient to reverse the direction of winding of the wire forming the windings 9 and 10, or the mode of connection thereof, or the direction of the current pulses which are caused to flow in the windings, in order to reverse the direction of the fields generated in the cylindrical space 5. The angles formed by those fields and the rest axis would then again be obtuse and the motor would also operate in the above-described manner.

It will be apparent that many modifications could be made in the form and relative arrangement of the various components of the motor shown in FIG. 1 without thereby departing from the scope of the invention.

For example, the windings 9 and 10 could be mounted on independent cores having one end connected to the pole piece 2 and the other end connected to the pole piece 3 and the pole piece 4 respectively. The independent cores could also not be aligned. Irrespective of the arrangement of the windings 9 and 10, the only condition that they are required to fulfil is that they each generate a field which passes through the cylindrical space 5, in response to a current. On the other hand, the pole faces 2a, 3a and 4a must be so disposed that that field forms an obtuse angle to the rest axis 12c, for one of the directions of flow of the current. For obvious reasons of symmetry, the rest axis 12c must be at least substantially parallel to the straight line 17 denoted by a dash-dotted line in FIG. 1. The straight line 17 is perpendicular to the axis of rotation 12a and passes through the middle of the pole face 2a.

The condition is obviously fulfilled when the magnetic axis 13a of the magnet 13 is disposed on the straight line 17. However, it is also fulfilled when the magnetic axis 13a is disposed virtually anywhere in a plane defined by the axis of rotation 12a and the straight line 17. The only positions at which the magnetic axis 13a may not be disposed are those where it is coincident with the axis of rotation 12a.

In all the positions in which it may be disposed, the magnetic axis 13a may also be oriented in any directions in which the field of the magnet 13 is such that the resultant thereof in the part of the above-defined plane which is in the cylindrical space has a non-zero component in the desired direction of the rest axis 12c.

In all cases where the positioning magnet 13 is not disposed precisely in the same plane as the magnet 12 of the rotor, the force that it applies to the latter has a component parallel to the axis of rotation 12a. That axial force causes an increase in the friction at one the pivots of the rotor in its bearing.

That disadvantage may be overcome by adding a second positioning magnet which is similar to the magnet 13 and which is disposed at a location such that its magnetic axis is substantially symmetrical to the magnetic axis 13a relative to the straight line 17. The second magnet therefore applies to the magnet 12 of the rotor a force whose axial component nullifies or at least reduces that which is due to the magnet 13. On the other hand, the radial components of those forces are added together, which increases the rotor positioning torque.

FIG. 1a is a view in partial cross-section of a motor comprising the above-mentioned second positioning magnet. All the other components of the motor are identical to the corresponding components of the motor shown in FIG. 1 and are denoted by the same references. The section in FIG. 1a is through the axis of rotation 12a and the straight line 17. The second positioning magnet and its magnetic axis are respectively designated at 18 and 18a.

In the example of actuation of the motor, as described hereinbefore, the end of the first pulse of each pair of pulses coincides with the beginning of the second pulse. Depending on the mechanical load which is to be driven by the motor, it is possible for the second pulse of each pair to be triggered a moment before or after the end of the first pulse. In the former case, the torque produced by the motor is increased, at the cost of a slight increase in current consumption. In the second case, in contrast, the current consumption of the motor is reduced, at the expense of a slight reduction in the torque that it can produce.

Figure 3:
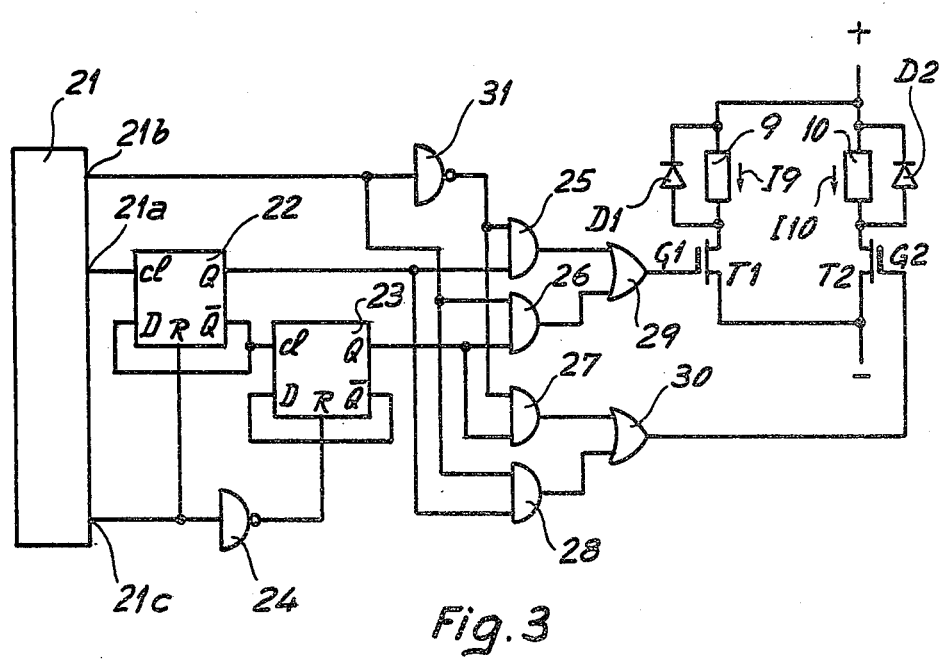
FIG. 3 is the circuit diagram of an example of an actuating circuit for the motor shown in FIG. 1.

FIG. 3 shows the circuit diagram of an example of the actuating circuit for the motor shown in FIG. 1 or 1a. FIGS. 4a and 4b are diagrams representing signals measured at various points in that circuit when the rotor is caused to rotate in its positive direction and in its negative direction respectively.

The motor is represented in FIG. 3 by its windings 9 and 10 which, on the one hand, are together connected to the positive terminal of an electrical power supply source (not shown) and, on the other hand, are connected separately to the drains of two N-type field effect transistors indicated at T1 and T2.

Two protection diodes D1 and D2 are each connected in parallel with one of the windings 9 and 10. The diodes D1 and D2 protect the transistors T1 and T2 in conventional manner from the over-voltages which, if such diodes were not provided, would occur at the terminals of the windings each time that the current was cut off.

The sources of the transistors T1 and T2 are connected together to the negative terminal of the power supply source.

A circuit 21 combines all the electronic circuits of the device with which the motor is associated. If that device is an electronic watch, the circuit 21 comprises a time base generally formed by a quartz oscillator and a frequency divider, and auxiliary circuits such as a correction circuit associated with a time setting stem and/or push buttons.

In the present example, the circuit 21 is so arranged as to supply at an output 21a a signal which for example switches to logic state 1 for a short time whenever the rotor of the motor is to perform a step. The direction in which the step is to be performed is determined by a signal supplied by an output 21b which, still by way of example, is at logic state 0 when the rotor is to rotate in its positive direction, and at logic state 1 when the rotor is to rotate in its negative direction. An output 21c of the circuit 21 supplies a periodic signal at a frequency of for example 128 Hz. The pulses supplied by the output 21a are synchronized with that periodic signal, in such a way that they go to state 1 at a moment at which the periodic signal goes to state 0.

The clock input Cl of a D-flip-flop 22 is connected to the output 21a of the circuit 21. The $\overline{Q}$ output of the flip-flop is connected to its D input and its reset input R is connected to the output 21c of the circuit 21. In that way, the Q output of the flip-flop 22 produces a pulse whenever the output 21a of the circuit 21 goes to state 1. The duration of that pulse is equal to a half-period of the signal supplied by the output 21c of the circuit 21, that is to say, 3.9 ms approximately in the example described herein.

The $\overline{Q}$ output of the flip-flop 22 is connected to the clock input Cl of another D-flip-flop 23, the $\overline{Q}$ output of which is also connected to its D input and the reset input R of which is connected to the output 21c of the circuit 21 by way of an inverter 24.

The Q output of the flip-flop 23 therefore supplies a second pulse, which is also of a duration of 3.9 ms approximately, at the end of each pulse supplied by the Q output of the flip-flop 22.

The two consecutive pulses supplied by the Q outputs of the flip-flops 22 and 23 are transmitted to the gates G1 and G2 of the transistors T1 and T2 by a logic circuit comprising AND-gates 25 to 28, OR-gates 29 and 30 and an inverter 31. That logic circuit, which will not be described in detail, functions as follows:

If the output 21b of the circuit 21 is at logic state 0, each pulse supplied by the Q output of the flip-flop 22 is transmitted to the gate G1 of the transistor T1 by the gates 25 and 29 and each pulse supplied by the Q output of the flip-flop 23 is transmitted to the gate G2 of the transistor T2 by the gates 27 and 30.

If, in contrast, the output 21b of the circuit 21 is at logic state 1, each pulse supplied by the Q output of the flip-flop 22 is transmitted to the gate G2 of the transistor T2 by the gates 28 and 30 and each pulse supplied by the Q output of the flip-flop 23 is transmitted to the gate G1 of the transistor T1 by the gates 26 and 29.

The logic states 0 and 1 are respectively represented in conventional manner by potentials equal to the potentials of the negative terminal and the positive terminal of the power source. When the Q outputs of the two flip-flops 22 and 23 are at state 0, the gates G1 and G2 are also at state 0. The two transistors T1 and T2 are therefore in a non-conducting condition and no current flows in the windings 9 and 10. That situation corresponds to the situation summarized in the line A of the table in FIG. 2.

When one of the gates G1 and G2 goes to logic state 1, in the above-described manner, the corresponding transistor T1 or T2 is switched into a conducting condition, and a current flows in the winding 9 or the winding 10, in the direction indicated by the arrows I9 and I10 in FIG. 3. It will be appreciated that that direction is the direction defined hereinbefore as positive, that is to say, the direction in which the field generated by each of those currents in the cylindrical space 5 is at an obtuse angle to the rest axis 12c.

When the output 21b of the circuit 21 is at state 0, a positive current therefore flows in the winding 9 during the pulse supplied by the Q output of the flip-flop 22, and a current which is also positive then flows in the winding 10 during the pulse supplied by the Q output of the flip-flop 23. That situation corresponds to the situation summarized in the lines B, C and D of the table in FIG. 2. The rotor of the motor therefore performs a step in its positive direction in response to the pulse supplied by the output 21a of the circuit 21 when the output 21b of the circuit 21 is at state 0.

When the output 21b of the circuit 21 is at state 1, a positive current first flows in the winding 10 during the pulse supplied by the Q output of the flip-flop 22. A current which is also positive then flows in the winding 9 during the pulse supplied by the Q output of the flip-flop 23. That situation corresponds to the situation summarized at lines E, F and G of the table in FIG. 2. The rotor of the motor therefore performs a step in its negative direction in response to the pulse supplied by the output 21a of the circuit 21 when the output 21b of the circuit 21 is at state 1.

In this embodiment, the motor actuating circuit comprises only two power transistors T1 and T2. Therefore, those power transistors take up on the integrated circuit an area which is four times less than that required for actuating the motor described in above-quoted British patent application GB No. 2 045 978 A. That considerable gain in area is due simply to the provision of the positioning magnet 13a which makes it possible for the motor to be actuated by current pulses all of the same direction.

In the actuating circuit shown in FIG. 3, the transistors T1 and T2 are both in a non-conducting condition as long as the rotor is not required to perform a step, and the windings 9 and 10 are in open circuit. It is sometimes desired for the windings to be short-circuited, at least for a moment, just after the end of the second current pulse, in order to accelerate damping of the oscillations of the rotor about its equilibrium position at the end of its stepping motion.

Figures 5, 6:
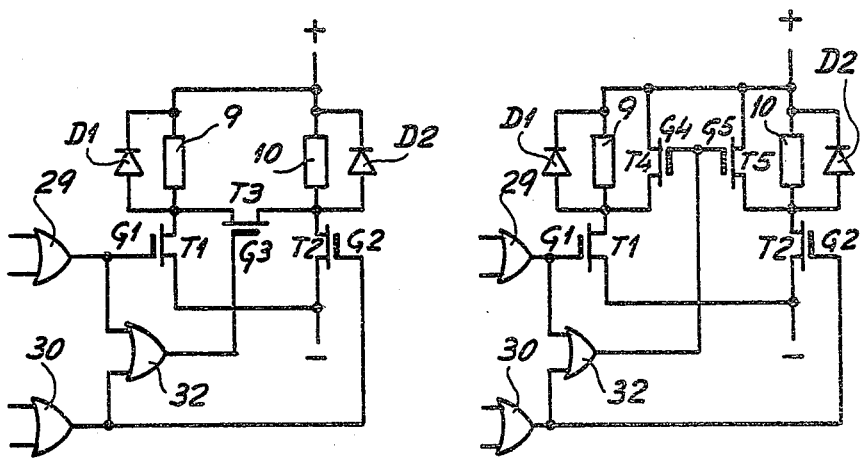
FIG. 5 is the circuit diagram of a first alternative embodiment of the actuating circuit shown in FIG. 3.
FIG. 6 is the circuit diagram of a second alternative embodiment of the circuit shown in FIG. 3.

FIG. 5 shows a portion of a first alternative embodiment of the circuit diagram shown in FIG. 3, which permits such a short-circuiting effect to be produced throughout the period of time between two successive steps of the rotor. As in the circuit shown in FIG. 3, the windings 9 and 10 are connected to the drains of the transistors T1 and T2, the gates G1 and G2 of which are connected to the outputs of the gates 29 and 30. The remainder of the logic circuit is identical to that shown in FIG. 3 and is not illustrated here.

The drain and the source of a third field effect transistor T3 are respectively connected to the drain of the transistor T1 and the drain of the transistor T2.

The drain and the source of a field effect transistor being interchangeable, it does not matter whether the drain or the source of the transistor T3 is connected to the drain of the transistor T1 or the transistor T2.

In the described embodiment, the transistor T3 is a P-type transistor. It is therefore in a non-conducting condition when its gate G3 is at logic state 1 and it conducts when the gate G3 is at logic state 0.

The gate G3 is connected to the output of an OR-gate 32, the inputs of which are connected to the outputs of the gates 29 and 30.

When any one of the outputs of the gates 29 and 30 is at state 1, that is to say, when a current is flowing in one of the windings 9 and 10, the gate G3 is therefore also at state 1 and the transistor T3 is in a non-conducting condition. The actuating circuit operates in the above-described manner.

In contrast, as soon as the outputs of the gates 29 and 30 are both at state 0, that is to say, from the end of the second current pulse, the gate G3 also goes to state 0 and the transistor T3 is switched into a conducting condition. The windings 9 and 10 are therefore connected in series in a circuit in which the current induced by the oscillations of the rotor about its rest position can circulate, which accelerates damping of the oscillations of the rotor.

The transistor T3 could also be a N-type transistor. In that case, it would be sufficient for an inverter to be interposed between the output of the gate 32 and the gate G3.

The fact that the two windings are in series however means that there is less efficient damping of the oscillations of the rotor, than if each winding were directly short-circuited. FIG. 6 shows a part of a second alternative embodiment of the circuit shown in FIG. 3, which permits direct short-circuiting of the windings 9 and 10.

In FIG. 6, the transistor T3 in FIG. 5 is replaced by two P-type field effect transistors T4 and T5, the drains of which are connected to the positive terminal of the power source and the sources of which are separately connected to the drains of the transistors T1 and T2 respectively. The gates G4 and G5 of the two transistors T4 and T5 are together connected to the output of the gate 32.

In that way, the transistors T4 and T5, like the transistor T3 in FIG. 5, are in a non-conducting condition while the current pulses are caused to flow in the windings, and they are conducting as from the end of the second current pulse. The windings 9 and 10 are therefore then directly short-circuited, thereby providing for maximum damping of the oscillations of the rotor.

It should be noted that, in these alternative embodiments, the number of transistors required for actuating the motor is at most equal to half the number of transistors used in the motor actuating circuit described in above-mentioned British patent application GB No. 2 054 978 A. That therefore means that even these alternative embodiments enjoy a substantial saving in surface area on the integrated circuit which combines all the electronic circuits of the device with which the motor is associated.

In addition, the rotor of the motor according to the invention performs a complete revolution in each step and consequently the current pulses required for actuation thereof are all of the same direction. That means that, if the rotor loses a step for any reason, that is to say, if it does not react to a pair of current pulses, it reacts to the following pair of pulses without losing a second step, provided of course that the cause of the loss of the first step has disappeared.

The actuating circuit which has just been described above produces pairs of current pulses which are equal in duration. In addition, the beginning of the second pulse of each pair coincides with the end of the first pulse. It will be apparent that it is possible to modify that actuating circuit in such a way that if necessary it produces pulses of different durations. It is also possible for it to be modified in such a way that the second pulse of each pair is triggered before or after the end of the first pulse. Those modifications are within the capability of the man skilled in the art and will not be described herein.

The motor actuating circuit may also be combined with a circuit for controlling the duration of the current pulses in dependence on the magnitude of the mechanical load which is actually driven by the motor. There are many types of such control circuits which are well known and which will therefore not be described herein. When the two windings are never operative at the same time, it is possible for the above-mentioned control circuit to be connected to the winding which does not have a current flowing therethrough by means of a switching circuit actuated by signals supplied by the logic circuit. The control circuit may then simply use the voltage induced in the winding to which it is connected at that moment, to cause the current in the other winding to be cut off at a moment depending on the mechanical load driven by the motor.

It will be apparent that the present invention is not limited to the embodiments described and illustrated in the drawings. Many modifications may be made in particular in the form and the arrangement of the various parts of the motor, without departing from the scope of the invention.

I claim:

1. A reversible stepping motor comprising:
    a rotor having an axis of rotation and including a first permanent magnet having a first magnetic axis substantially perpendicular to the axis of rotation;
    means for orienting the first magnetic axis along a rest axis in the absence of any other influence; and
    means for applying to the first magnet a first magnetic field in response to a first current and a second magnetic field in response to a second current, the first and the second magnetic fields being substantially perpendicular to the axis of rotation and also forming two substantially symmetrical obtuse angles with the rest axis.

2. The motor of claim 1, wherein the means for applying a first and a second magnetic field comprise:
    a first pole piece comprising a first pole face substantially symmetrical with respect to the rest axis;
    a second pole piece and a third pole piece respectively comprising a second pole face and a third pole face substantially symmetrical to each other with respect to the rest axis and defining with the first pole face a substantially cylindrical space having an axis substantially coincident with the axis of rotation;
    a first winding magnetically coupled to the first and the second pole piece; and
    a second winding magnetically coupled to the first and the third pole piece.

3. The motor of claim 1, wherein the means for orienting the first magnetic axis comprise a second permanent magnet having a second magnetic axis disposed substantially in a plane comprising the axis of rotation and the middle of the first pole face.

4. The motor of claim 3, wherein the means for orienting the first magnetic axis further comprise a third permanent magnet having a third magnetic axis substantially symmetrical to the second magnetic axis with respect to the rest axis.

5. The motor of claim 1, wherein the value of the obtuse angles is from about 100° to about 160°.

6. The motor of claim 5, wherein the value of the obtuse angles is substantially equal to 120°.

7. A method for actuating the motor of claim 2, comprising:
    producing a pair of consecutive current pulses;
    applying the first and the second pulse of the pair to the first and the second winding respectively for causing the rotor to rotate in a first direction; and
    applying the first and the second pulse of the pair to the second and the first winding respectively for causing the rotor to rotate in the second direction; the current pulses being so produced that the fields they produce in the cylindrical space when they are applied to the windings form the obtuse angles with the rest axis.

* * * * *